July 20, 1965         M. W. BEARDSLEY         3,195,665
PLENUM CHAMBER GROUND EFFECT MACHINE
Filed Nov. 23, 1960

INVENTOR
MELVILLE W. BEARDSLEY
BY *A. Fred Starobin*
ATTORNEY 3,195,665
PLENUM CHAMBER GROUND EFFECT
MACHINE
Melville W. Beardsley, Severna Park, Md., assignor, by mesne assignments, to A. Fred Starobin, Washington, D.C.
Filed Nov. 23, 1960, Ser. No. 71,252
4 Claims. (Cl. 180—7)

The present invention relates to surface vehicles of the ground effect machine type, and has particular reference to an improved form of plenum chamber vehicle.

One of the outstanding advantages of the invention lies in the achievement of a simple, effective lifting system which can be used to support vehicles over a ground surface without physical contact.

With the present invention it is possible to achieve increased lift and height above a ground surface for a plenum chamber type of lifting device.

Basically, the present invention provides a novel and improved means to confine pressure and air flow in a chamber which has one side open to, but not in physical contact with, a flat surface.

Wherever a surface or ground surface is mentioned in the specification or claims, it is not to be considered confined in any way to a surface over land, since fluid surfaces such as water or other fluids denser than the fluid through which the vehicle is traveling will be equally capable of supporting a vehicle of the type in this invention.

Figure 1:
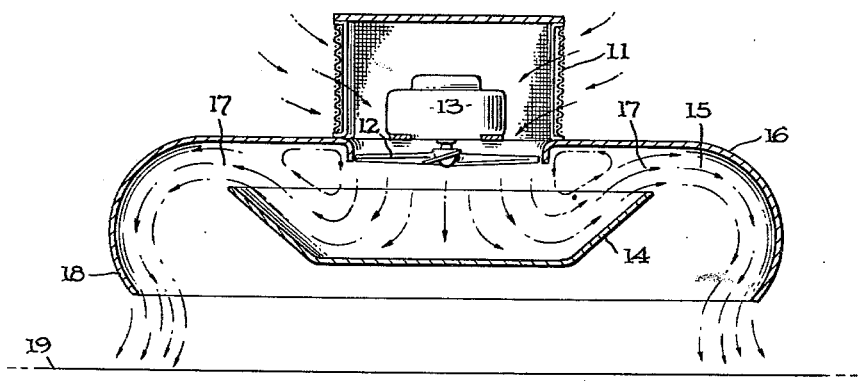
Figure 2:
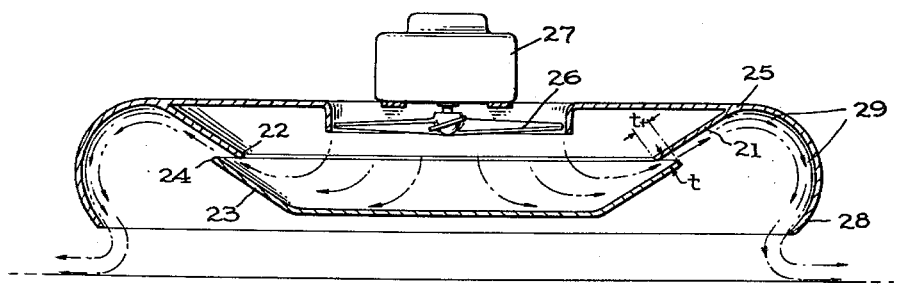

The above and other objects and advantages of the invention will become apparent upon full consideration of the following detailed description and accompanying drawings, in which:

FIG. 1 is a cross-section of a vehicle incorporating the invention and illustrating the principles of operation; and FIG. 2 is a cross-section of a vehicle showing a different embodiment of the present invention.

In application Serial No. 26,165, filed May 2, 1960, on an Airborne Surface Vehicle, and since issued as Patent No. 3,039,550, there was described a vehicle that could achieve increased lift and height above a ground or water surface through the use of a specially shaped type of plenum chamber with characteristics not found in any of the prior art. This invention also makes use of this new type of plenum chamber but has added certain structure whereby even better results in regard to lift and height above a surface are achieved.

In accordance with the invention, as illustrated in FIG. 1, air is drawn in through screen or grating 11 by blower 12 driven by engine 13. Blower 12 is placed low in its shrouding in order to create a greater downward component. This placement of the blower in this invention is desirable and is possible here because of the omission of interfering structure that would be necessary if not for the new construction used in this invention. A dish-shaped element 14 is located beneath blower 12 in order to cause a deflection of the air as depicted by arrows 15. The main flow of air from blower 12 is deflected by dish-shaped section 14 back toward plenum body shell 16 and constricted at point 17 into a flow parallel to and along body shell 16. The air flow follows the curve of body shell 16 along downwardly curving sides having a minimum effective radius of curvature exceeding the width of the constriction at point 17 and is expelled at the inwardly curved bottom edge 18. The air flow then curves outwardly until it is parallel to ground plane 19.

In FIG. 2 there is shown a vehicle similar to the one shown and described in connection with FIG. 1 but containing an additional air deflecting element 21 with circular edge 22 extending into dish-shaped element 23 and overlapping its edge 24. It has been found that the best results are obtained with a device of this type when the overlap $t_+$ of air deflecting element 21 and dish-shaped element 23 is greater than the distance between them designated as distance $t$ in FIG. 2. The greater overlap acts to constrain the flow of air sufficiently to assure its passage in the desired direction of flow with its adherence to the inner surface of body shell 25 as described below. As described in connection with FIG. 1, air is drawn into the body shell 25 by blower 26 driven by engine 27. There the air flow is deflected by dish-shaped element 23 and passes between edges 22 and 24 of air deflecting element 21 and dish-shaped element 23, respectively. The flow of air then moves along the underside of the surface of air deflecting element 21 and the inside surface of plenum chambed body shell 25 and is expelled at the inwardly curved bottom edge 28, as discussed in connection with FIG. 1 and shown by arrows 29. The addition of air deflecting element 21 to the structure of the vehicle allows a smoother flow of the air along the inside of body shell 25 with somewhat greater lift and height attained than even the embodiment shown in FIG. 1, since the losses due to turbulence of the air above the dish-shaped element are decreased with the more efficient channelling of the air flow.

In the operation of the novel craft of this invention, a jet sheet of substantially uniform thickness is discharged around the inner bottom edges 18 or 28 of the body shells 16 and 25, respectively. In this manner, vehicles incorporating the essentials of this invention achieve the height-lift-power characteristics of peripheral jet vehicles which are superior to the characteristics of other plenum chamber vehicles which do not have the characteristics of the vehicles of this invention, since their height attained is determined by the area required for horizontal discharge of air out of the pressurized plenum. At the same time this invention also achieves the advantages of the fundamental simplicity characteristics of plenum chamber vehicles, since no complex ducting is required to control and direct the air flow from the blower to the point of discharge.

Body shells 16 and 25 have been shown in sectional views only, since these body shells may take many different shapes and still operate in accordance with the invention described and claimed herein. A circular shaped vehicle or one of some other symmetrical shape can readily be adapted to the structure described by this invention.

From the foregoing, varied application of the novel aspects of the invention will occur to those skilled in the art, and variations in matters of detail will be apparent; and therefore it is appropriate that the appended claims be accorded a latitude of interpretation, consistent with the spirit and scope of the invention.

What is claimed is:

1. A vehicle able to support itself above a surface by fluid pressure comprising
a plenum shell open toward the surface and including an upper surface and downwardly and inwardly curving sides,
a fluid flow pump located to discharge fluid into said shell,
means for deflecting fluid within said plenum shell located in the path of fluid from said fluid flow pump and adjacent thereto and extending upwardly and outwardly,
a wall section extending downward from said upper surface of said plenum shell,
and an edge portion of said means for deflecting fluid spaced from said wall section in substantially parallel and overlapping relationship to said wall section whereby the fluid from said fluid flow pump is deflected through the spacing between said wall section and said edge portion of said means for deflecting fluid,
said downwardly curving sides curving inwardly and having a minimum effective radius of curvature exceeding the distance between said edge portion of said means for deflecting fluid and said wall section adjacent thereto.

2. The vehicle of claim 1, further characterized by the bottom edges of said plenum shell curving inwardly.

3. A vehicle able to support itself above a surface by fluid pressure comprising
 a plenum shell open toward the surface and including an upper surface and downwardly and inwardly curving sides,
 a fluid flow pump located to discharge fluid into said shell,
 means for deflecting fluid within said plenum shell located in the path of fluid from said fluid flow pump and adjacent thereto and extending upwardly and outwardly,
 a wall section extending downward from said upper surface of said plenum shell,
 and an edge portion of said means for deflecting fluid spaced from said wall section in substantially parallel and overlapping relationship to said wall section whereby the fluid from said fluid flow pump is deflected through the spacing between said wall section and said edge portion of said means for deflecting fluid,
 the overlap distance between said wall section edge and said edge portion of said means for deflecting fluid being greater than the distance between said substantially parallel surfaces.

4. A vehicle able to support itself above a surface by fluid pressure comprising
 a plenum shell open toward the surface and including an upper surface and downwardly and inwardly curving sides,
 a fluid flow pump located to discharge fluid into said shell,
 means for deflecting fluid within said plenum shell located in the path of fluid from said fluid flow pump and adjacent thereto and extending upwardly and outwardly,
 a wall section extending downward from said upper surface of said plenum shell,
 and an edge portion of said means for deflecting fluid spaced from said wall section in substantially parallel and overlapping relationship to said wall section whereby the fluid from said fluid flow pump is deflected through the spacing between said wall section and said edge portion of said means for deflecting fluid,
 the overlap distance between said wall section edge and said edge portion of said means for deflecting fluid being greater than the distance between said substantially parallel surfaces,
 said downwardly curving sides curving inwardly and having a minimum effective radius of curvature exceeding the distance between said edge portion of said means for deflecting fluid and said wall section adjacent thereto.

References Cited by the Examiner

UNITED STATES PATENTS 3,042,129  7/62  Wade _____ 180—7

FOREIGN PATENTS 219,133  11/58  Australia.

OTHER REFERENCES

"Symposium on Ground Effect Phenomena," Oct. 21–23, 1959, pub. by Princeton University, pages 42, 53 and 359.

"Science and Mechanics," issue of June 1960, pages 73–77.

A. HARRY LEVY, *Primary Examiner.*

PHILIP ARNOLD, *Examiner.*